Sept. 22, 1931.  A. S. NORMENT  1,824,680

TIRE

Filed Feb. 25, 1931  4 Sheets-Sheet 1

Fig. 1.

A. S. Norment, INVENTOR

BY A. L. Evans
ATTORNEY

Sept. 22, 1931.　　　A. S. NORMENT　　　1,824,680
TIRE
Filed Feb. 25, 1931　　　4 Sheets-Sheet 2
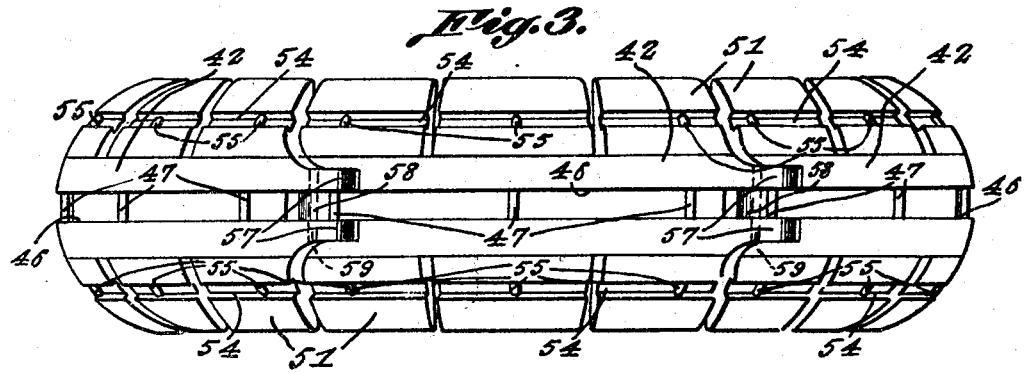
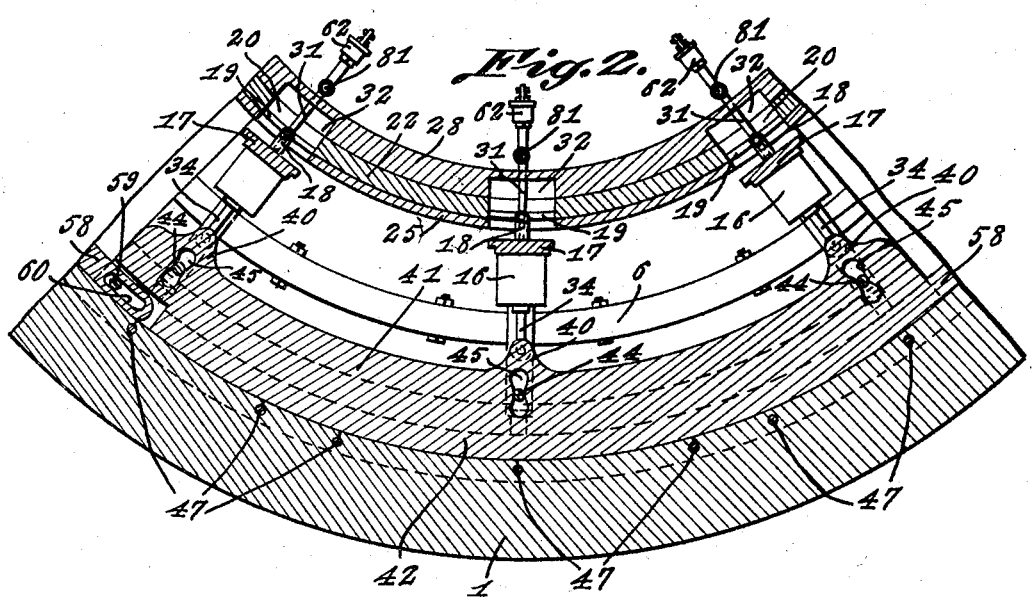
A. S. Norment, INVENTOR
A. L. Evans, ATTORNEY

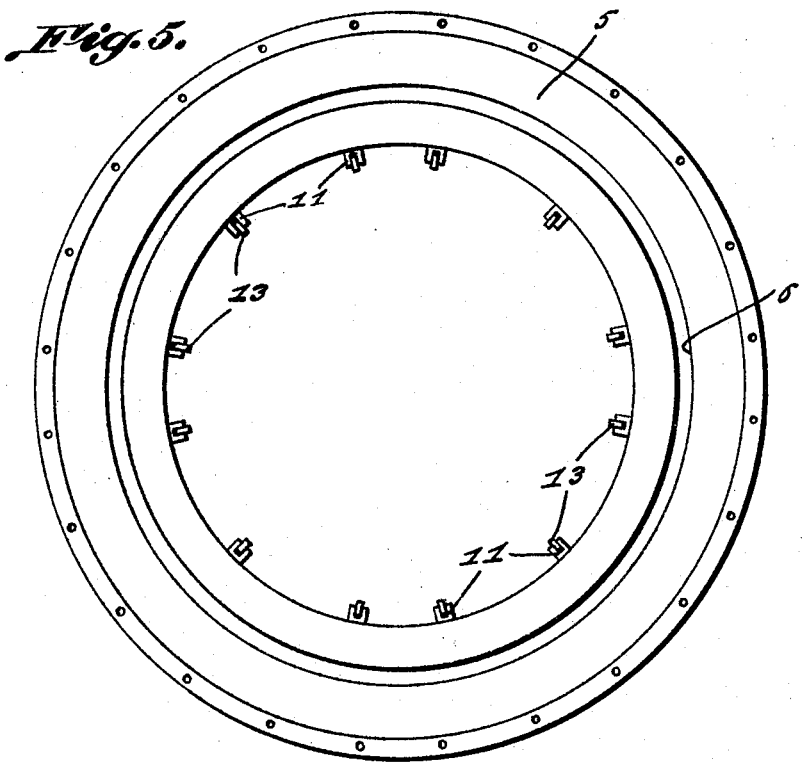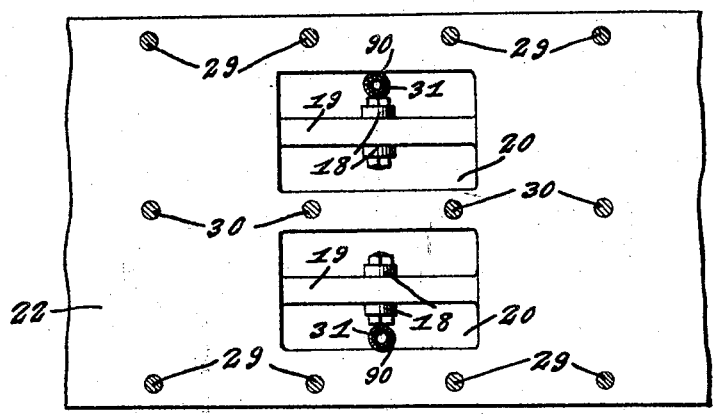

Sept. 22, 1931.     A. S. NORMENT     1,824,680
TIRE
Filed Feb. 25, 1931     4 Sheets-Sheet 4

A. S. Norment, INVENTOR
BY A. L. Evans
ATTORNEY

Patented Sept. 22, 1931

1,824,680

UNITED STATES PATENT OFFICE

ALVA S. NORMENT, OF RICHMOND, VIRGINIA

TIRE

Application filed February 25, 1931. Serial No. 518,181.

The object of this, my present invention, is the provision of a tire for automobile or like vehicle wheels of a construction that will outlast the life of the wheel on which it is attached, which is resilient, which will absorb shocks and jars to the extent that the vehicle need not be equipped with ordinary shock absorbers, which is puncture proof and is likewise proof against blow-outs so that the vehicle equipped with the tire is rendered absolutely safe in both of these respects, and further wherein the outer rubber casing of the improvement will be cushioned to compensate for shocks and jars not only delivered to the treads thereof but to the sides of the casing.

A further object is the provision of a wheeled tire that embodies both mechanical and pneumatic means for cushioning the tire and for absorbing all shocks and jars to which the tire may be subjected and which shall be absolutely puncture proof.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

In the drawings:

Figure 1 is an enlarged transverse sectional view through a tire in accordance with this invention.

Figure 2 is a sectional view approximately on the line 2—2 of Figure 1.

Figure 3 is an outer face view of the core.

Figure 4 is a side elevation of one of the core sections.

Figure 5 is a side elevation of the core.

Figure 6 is a sectional view approximately on the line 6—6 of Figure 1.

Figure 8:
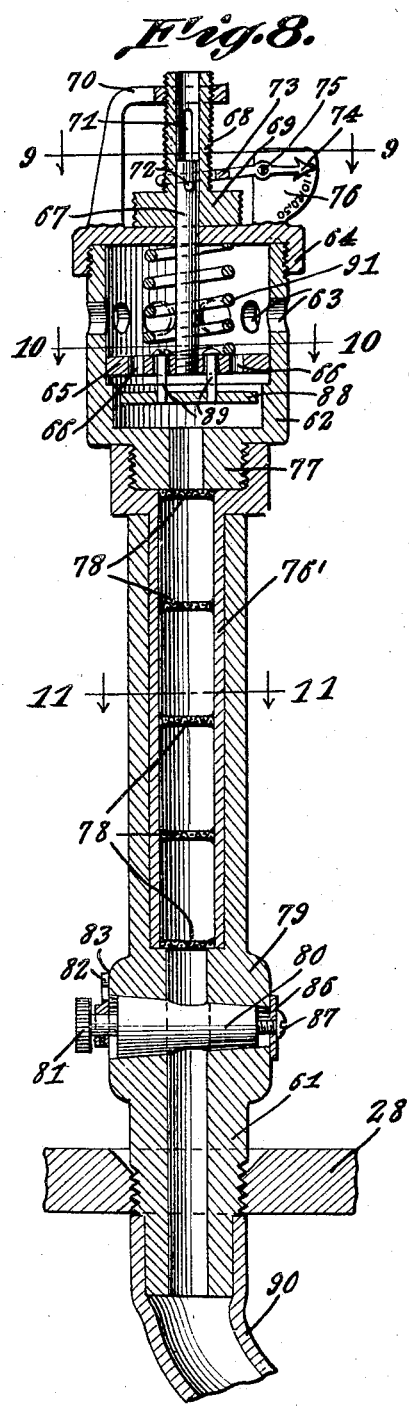
Figure 8 is an approximately central longitudinal sectional view therethrough.
Figure 7:
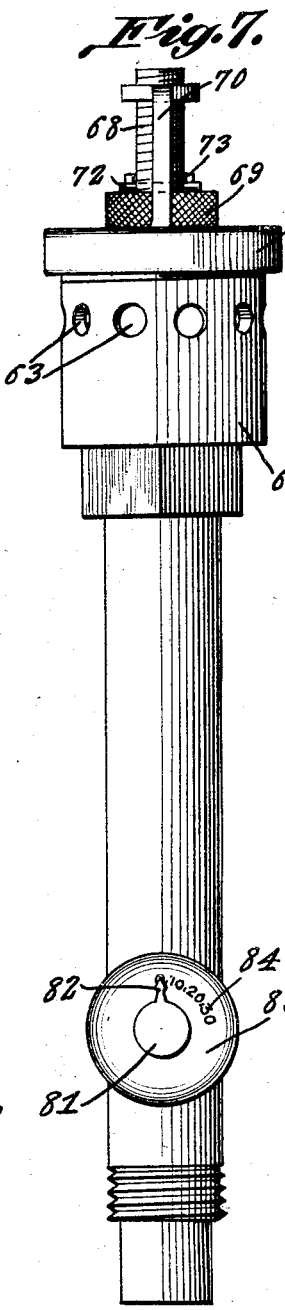
Figure 7 is a side elevation of the air controlled regulator and gage.
Figure 9:
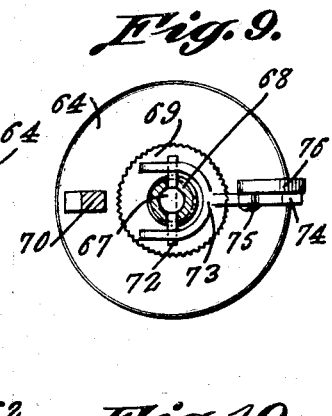
Figure 10:
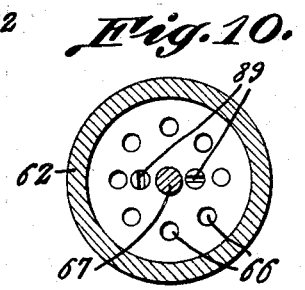
Figure 11:
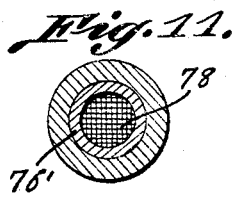

Figures 9, 10 and 11 are transverse sectional views respectively on the lines 9—9, 10—10 and 11—11, of Figure 8.

The casing 1 of the tire is of vulcanized rubber, suitably reinforced in the usual manner. The tread, and also the side walls of the casing may be of a materially greater thickness than those of ordinary casings, and the tread of the said casing is provided with integral calks to prevent the skidding of the tire. The casing 1, on its inner face, in a line with the center of the tread, is integrally formed with a circumferential rib 2, and with the ribs 3 at the opposite sides of the central rib 2, and the side walls of the casing are also formed with inwardly directed circumferential ribs 4. The tread portion of the casing and that of the core are somewhat flat in order to have the same effect as an air inflated tire in that my improved tire rests squarely on the ground and has no rolling effect. As the core is of hard material it is also necessary that the same be shaped to fit the ground as otherwise the rubber casing would wear only at the center of the tire, so that the wheel would very easily skid.

Arranged in the casing 1 there is an annular member whose outer sides are shaped to correspond with the inner sides of the walls of the casing 1. This member is constructed of some light tough material preferably of metal and the said member comprises what I will term the core 5 for the casing. The core 5 has its sides formed with oppositely disposed circumferential grooves to receive therein the ribs 4 of the casing 1. The grooves are of rectangular formation and are formed in the core by providing the said core with inwardly directed substantially U-shaped portions or flanges 6. The ribs 4 of the casing are held in the grooves or pockets by any suitable means, those illustrated by the drawings being in the nature of short bolts which are engaged by nuts and access is obtained to these nuts and bolts through openings between reinforcing ribs 6 between the top and the bottom of the core, the sides of the core between the flanges that provide the pockets or grooves for the ribs 4 being cut-away or provided with continuous depressions 7 whose inner walls are concaved and whose outer walls are likewise concaved, the same defining the inner walls of the sides of the core between the reinforcing ribs and the bottom of the core. The core is centrally formed with a hollow portion, but the bottom thereof is solid and which bottom surface of the core is indicated by the numeral 8. The outer periphery of the core has its corners arranged at opposite angles, and these corners, at desired spaced intervals, are provided with sockets 10 for plungers 11 that are influenced by springs 12. The outer ends of the plungers 11 are bifurcated for the reception of rollers 13 whose short shafts or trunnions 14 are journaled in the said bifurcated ends of the members 11. The purpose of this arrangement will be presently described.

The central hollow portion or bore 15 of the core 5 has arranged therein at suitable circumferentially spaced intervals the barrels 16 of air pumps. The pumps are arranged in tandem, that is, one pair of pumps is arranged side to side and the barrels of the pumps are screwed in depending interiorly threaded annular flanges on the head plate 17 for the said barrels. The heads 17 have their outer faces, in a line with the respective barrels 16, provided with pairs of outstanding ears 18 which receive therebetween and which are pivotally secured to ribs 19 provided centrally and longitudinally with substantially rectangular openings 20 in a ring plate 22. The plate 22 has its lower corner provided with an annular cutaway or depressed portion to receive therein lips or flanges 23 formed on the inner and straight end walls of the core 5, the bore 15 of the core 5, at the portion thereof in which the heads of the barrels 16 are received being widened. The lips 23 have threaded therethrough bolt or screw members 24 which secure against the inner facing of the lips an annular plate 25 provided with openings alining with the openings 20.

The inner edges of the casing 1 are flanged inwardly to arrange the same over the upper and straight and peripheral edges of the core 5, secured thereto by screws or analogous devices 26, while transversely arranged screws 27 pass through the sides of the casing 1 and enter the said end of the core 5.

It is to be noted that the pump barrels 16 are hingedly supported, and there is arranged around the inner edge of the tire the flanged rim 28 for the wheel. There is passed through the rim 28 screw members 29 that are threaded into the ring plate 22 and a screw 30 that screws through the center of the rim and enters threaded openings in the ribs or walls that space the openings 20 in the ring plate 22. The object of this part of the invention is that the tire may be fastened to the wheel in the same manner as the lugs which are in common use. The air gage passes through the rim and the rim of the wheel.

The air inlet and outlet tubes for the barrels 16 are indicated by the numeral 31 and are threaded through the head plates 17 and pass through the openings in the plates 25 and 22 and have their outer ends received in depressions or pockets 32 on the inner face of the wheel rim 28.

A quantity of oil may be admitted through the pipes 31 into the barrels for lubricating the compressible outer disc heads 36' of the plungers in said barrels. The inner elements of the plunger heads are of metal and are indicated for distinction by the numeral 33. To these head sections 33 there are fixed the plunger rods 34 that pass through the barrels 16. The head members 33 have their inner faces provided with ears 35, and the barrels have their inner faces provided with similar ears 36 and the respective ears receive therein the ends of convolute compression springs 37.

The rods 34 have their ends provided with hubs through which pass pivot bolts 38 on the widened ends 39 of ears 40. The ears 40 project from the inner periphery of the webs 41 of segmental shoes 42. The shoes are of metal and in the preferred embodiment of the invention four circularly arranged circumferential shoes are employed.

The webs 41 are guided through a central continuous opening 43 in the end 8 of the core 5, and the opposite walls provided by the opening 43, in a line with each of the ears 40, have connected thereto pins or rollers 44 that normally pass through the restricted central passage of substantially 8-shaped slots or transverse openings 45 in the webs 41 of the respective shoes 42.

The outer faces of the shoes 42 are convexed to correspond with the inner concaved surface at the tread portion of the casing 1 and the said shoes are provided with central grooves 46 for the ribs 2. Between the side walls provided by the grooves 46 there are transverse ribs or lubs 47 and these lugs are received in suitable depressions or openings provided therefor in the ribs 2 of the casing. The sides of the shoes 42 are rounded and, at desired spaced intervals are formed with rounded depressions 48 and the inner walls provided by these depressions are formed with arcuate slots 49. In the depressions 48 there are received the rounded portions or ears 50 provided at desired spaced intervals on the inner and thickened ends of wing members 51. The ears 50 are peripherally formed with lugs 52 which are received in the slots 49 while pivots 53 connect the ears to the sides of the shoes 42. The outer faces of the wings 51 are convex and snugly contact with the inner walls at the sides of the tread surface of the casing 1, and the said convex walls of the shoes are provided with grooves 54 to receive therein the ribs 3 of the casing 1. The inner walls provided by the grooves 54 are, at spaced intervals, formed with transversely arranged lugs 55, to be received in suitable depressions or openings provided therefor in the ribs 3 and the rollers 13 of the plungers 11 are in constant contact with the inner and angle faces 56 of the wings 51.

The adjacent shoes 42 are provided respectively at the center thereof with spaced projecting ears 57 and a tongue 58 to be received between the ears. Passing through the tongues and ears there is a pivot element 59. The pivot element passes through elongated slots 60 in the tongues 58 which permits of a slight longitudinal movement of the shoes with respect to each other. The ears and the tongues 58 are as large as the tire construction will permit. The object of this is not only to provide connections between the sections or segments of the core but by having the tongue as large as possible on the bottom of the tire it will insure smooth passage of the car from one section of the core to the other.

As far as the description has progressed it will be noted that the core is firmly fixed to the casing and likewise that the shoes 42 and their wing extensions 51 are also effectively fixed to the casing. When the weight of the load to which the tire is subjected is directed to the tread portion thereof the said tire will be slightly compressed. This compression will be resisted by the plungers 11, but the depression is sufficient to impart a movement to the plungers or pistons in the air pump barrels 16. This will tend to force air through the pipes 41 but the full flow of air through said pipes will be resisted in a manner which will presently be described. As the tire travels circumferentially this action will be repeated by the several shoes which extend the circumferential length of the said tire. As each of the shoes is relieved from this pressure the compression springs 37 will move the pistons in the barrels 16 to draw air into the barrels. The air serves as a shock absorber. Should the sides of the tread be subjected to pressure such pressure will be yieldably resisted by the rollers 13 on the spring influenced plungers 11. As practically the entire interior of the casing 1 is shod and protected by metal the said casing cannot be deflated by ordinary punctures as well as blow-outs which are far more dangerous than punctures and regardless of the direction of the strain to which the casing is subjected the said casing cannot collapse. The tire construction, it will be noted, renders the casing 2 of a strong and durable nature so that the same will be of a life at least equal to that of the wheel upon which it is arranged and really should outlast the life of such wheel. The tire is not only rendered of a greater resiliency than that of an ordinary air inflated tire, but resists and absorbs shocks to a degree that a vehicle equipped with the improvement will not require the ordinary shock absorbers.

The rim 28, in a line with its pockets or depressions 23, have screwed therein, the lower ends of pipe members 61. These pipes have screwed on their outer end bosses formed on the inner and closed ends of cylindrical members 62. Each cylindrical member is provided with a series of circumferential apertures 63 and each cylinder is closed by a flanged cap 64. In each cylinder there is a disc head 65 provided with circumferentially arranged apertures 66 and to each disc 65 there is centrally connected a stem 67. The stems 67 pass through the top members 64 of the cylinders and likewise through a bore in a bolt member 68. The bolt has a head 69 that rests on the head 64 when it is desired to test the air pressure in the pumps. The turning of the nut 69 will screw the same to the top of the hollow bolt 68, thus lifting the pin connected to the disc heads above the apertures 63, allowing a free escape of air from the pumps and eliminating continuous use of the gage. When there is reason to believe that air is not functioning properly in the pumps the nut 69 is turned to rest on the head 64, which arranges the gage in proper position to register. The hollow bolt is screwed through an opening in the horizontal arm of a bracket 70 that is fixed to the head 64. The stem of the hollow bolt is provided with an elongated slot 71 and there is passed transversely through this slot and through the rod 67 a pin 72. The pin is in the path of contact with the lower face of the yoked end 73 of a pointer 74. The pointer is pivoted, as at 75, on a dial or indicator plate 76 which is fixed to and extends outwardly from the cylinder head 64. The plate 76 has inscribed thereon numerals indicating points pressure of air over which the dial hand 74 is movable.

Arranged in the pipe 61 there is a tube 76'. This tube is preferably formed with a head which is screwed directly on the boss end 77 of the cylinder 62 and in the tube 76' there are any desired number of spaced screen discs 78. The boss 77 is provided with a central opening that communicates with the bore of the tube. The pipe 61 has an outwardly thickened portion 79 provided with a tapered bore for the reception of a tapered valve plug 80. The plug or core 80 has an opening therethrough to register with the bore of the pipe 61 and has on its widened end a stem extension that is provided with a knurled head 81 and which stem carries a narrow hand or indicator 82 designed to travel over a dial surface 83 on the said thickened portion 79 of the pipe. The dial surface has inscribed thereon numerals 84 indicating pounds pressure of air and the reduced end of the plug 80 is held in its tapered seat by a spring washer 86 held against the thickened portion 79 of the pipe by a headed screw or bolt 87.

Arranged below each of the apertured discs or heads 65 there is another and smaller disc 88. The disc 65 has passed therethrough the stems of headed bolts 89 which are screwed in the discs 88, the said bolts being freely movable through the heads 65.

On the inner end of each of the pipes 61 there is connected a flexible pipe or tube 90 and the respective tubes 90 are connected to the respective air inlet and outlet pipes 31 for the air pumps.

As disclosed by Figure 8 a coil compression spring 91 is arranged between the head or cap 64 and the plunger 65 to normally influence the plunger downwardly in the casing 62.

The valve and gage construction just described is highly desirable if not essential to the tire construction, as by this arrangement visible evidence may be obtained as to the working of the parts constituting the tire, especially the working of the pumps or air compressors without obtaining access to the interior of the tire. By the arrangement a certain compression of air in the pumps, in conjunction with the springs on the inside of the pumps may be adjusted so that there will be no sudden jars when the tire contacts with rough surfaces, and at the same time the tire will be prevented from too much yielding and thereby take care of shocks imparted thereto in all directions, especially on the rebound. The valve can be adjusted to suit the weight of any car and can at any time be checked and adjusted to suit the needs of the tire from the outside of the tire. By the employment of the double plunger, that is, the discs or heads 65 and 88, air is freely drawn into the pumps upon the intake strokes and the plunger 88 will close the apertured plunger 65 upon the compression stroke of the said pumps. The valve 80 regulates the flow of air through the pipe 61 and the indicator on the cap or head 64 of the cylinder 62 will register the same amount of air pressure drawn into the pumps as will the register comprising the elements 82 and 83. Thus the air pressure coming from the pumps lifts the bottom or smaller plunger, drawing it upwardly against the top plunger. This closes the top plunger and prevents the escape of air and throws the entire pressure against the plunger which can only give in accordance with the pressure in the spring 91. In this way there is indicated the air pressure in the pumps and should the air pressure fluctuate the spring will throw the top plunger to its proper position for the next revolution of the wheel. Also the natural suction of air will force the bottom or smaller plunger down in a more rapid manner than is the top plunger moved, thus allowing the intake of air through the apertures in the top plunger, thus permitting the flow of air through the top plunger, which allows the gage to be set for the next revolution of the wheel.

The casing and core are so constructed that the casing can be removed to obtain access to the core should any parts require repairs or replacement.

Having described the invention, I claim:

1. A tire construction including a rubber casing, a hollow metal core therein rigidly secured thereto, shoes in and arranged opposite the tread surface of the casing, means loosely connecting the confronting ends of the shoes, interengaging means between the shoes and the casing for holding the shoes from independent circumferential movement, a web on each shoe entering the hollow core, compression pumps arranged in pairs in the casing and having their plungers spring influenced in one direction, and their said plungers being loosely connected with the webs, and designed to be operated by the shoes when the said shoes are subjected to pressure by the weight of a load on the casing.

2. A tire construction including a rubber casing, a hollow metal core therein rigidly secured thereto, shoes in and arranged opposite the tread surface of the casing, means loosely connecting the confronting ends of the shoes, interengaging means between the shoes and the casing for holding the shoes from independent circumferential movement, a web on each shoe entering the hollow core, guide means between the webs and the casing permitting a limited lateral independent movement of the shoes in the casing, compression pumps arranged in pairs in the casing and having their plungers spring influenced in one direction, and their said plungers being loosely connected with the webs, and designed to be operated by the shoes when the shoes are subjected to pressure by the weight of a load on the casing.

3. A tire construction including a vulcanized rubber casing, a hollow metal core therein and fixedly secured thereto, shoes between the core and the inner surface of the tread portion of the casing, air compression pumps spring influenced in one direction and operated in a second direction, upon the movement of the shoes when the said shoes are subjected to pressure by the tread of the tire and spring influenced wings pivotally secured to the edges of the shoes.

4. A tire construction including a vulcanized rubber casing, a hollow metal core therein and fixedly secured thereto, shoes between the core and the inner surface of the tread portion of the casing, air compression pumps spring influenced in one direction and operated in a second direction, upon the movement of the shoes when the said shoes are subjected to pressure by the tread of the tire and spring influenced wings pivotally secured to the edges of the shoes and interengaging means between the shoes and the casing.

5. A tire construction including a vulcanized rubber casing, a hollow metal core therein and fixedly secured thereto, shoes between the core and the inner surface of the tread portion of the casing, air compression pumps spring influenced in one direction and operated in a second direction, upon the movement of the shoes when the said shoes are subjected to pressure by the tread of the tire and spring influenced wings pivotally secured to the edges of the shoes and interengaging means between the shoes and the casing and means limiting the swinging of the wings on the shoes.

6. A tire construction including a vulcanzed rubber casing, a hollow metal core therein and fixedly secured thereto, shoes between the core and the inner surface of the tread portion of the casing, air compression pumps spring influenced in one direction and operated in a second direction, upon the movement of the shoes when the said shoes are subjected to pressure by the tread of the tire and spring influenced wings pivotally secured to the edges of the shoes and interengaging means between the shoes and the casing, means limiting the swinging of the wings on the shoes, said spring influenced means including rollers which contact with the shoes, plungers on which the rollers are mounted, said core having sockets in which the plungers are received and springs between the plungers and the inner walls of the sockets.

7. A tire construction including a vulcanized rubber casing, a hollow core therein, rigidly secured thereto, interengaging means between the core and casing, shoes arranged in and disposed circumferentially around the casing and contacting with the casing opposite the tread surface thereof, interengaging means between the shoes and the casing, means for loosely and pivotally connecting the confronting ends of the shoes, a web arranged centrally of and extending the length of each shoe and received in the hollow core, said webs having substantially 8-shaped slots therein and parts carried by the core to be received in said slots, spring influenced wings pivotally secured to the ends of the shoes, compression pumps having their inner ends suspended in the core, and having plungers therein spring influenced in one direction and rods for the plungers which are connected to the webs and each of said pumps having a pipe connection communicating with the atmosphere, for the purpose set forth.

8. A tire construction including a vulcanized rubber casing, a hollow core therein, rigidly secured thereto, interengaging means between the core and casing, shoes arranged in and disposed circumferentially around the casing and contacting with the casing opposite the tread surface thereof, interengaging means between the shoes and the casing, means for loosely and pivotally connecting the confronting ends of the shoes, a web arranged centrally of and extending the length of each shoe and received in the hollow core, said webs having substantially 8-shaped slots therein and parts carried by the core to be received in said slots, spring influenced wings pivotally secured to the ends of the shoes, compression pumps having their inner ends suspended in the core and having plungers therein spring influenced in one direction and rods for the plungers which are connected to the webs, each of said pumps having a pipe connected therewith, a tube leading therefrom, a pipe member communicating with the atmosphere and connected with each tube, a valve comprising a pressure gage controlling the passage through each pipe, an air filter in each pipe, an apertured casing on the outer end of each pipe, an apertured valve therein, a weighted disc valve slidable on the apertured valve, spring means influencing the valves to one position, a stem on the valve passing through the top of the casing, an air gage on the valve casing and a finger therefor loosely connected with the stem of each valve.

9. A tire construction including a vulcanized rubber casing, a hollow core therein, rigidly secured thereto, interengaging means between the core and casing, shoes arranged in and disposed circumferentially around the casing and contacting with the casing opposite the tread surface thereof, interengaging means between the shoes and the casing, means for loosely and pivotally connecting the confronting ends of the shoes, a web arranged centrally of and extending the length of each shoe and received in the hollow core, said webs having substantially 8-shaped slots therein and parts carried by the core to be received in said slots, spring influenced wings pivotally secured to the ends of the shoes, compression pumps having their inner ends suspended in the core, and having plungers therein spring influenced in one direction and rods for the plungers which are connected to the webs and each of said pumps having a pipe connection communicating with the atmosphere, and an air gage on each pipe.

10. A tire construction including a vulcanized rubber casing, a hollow core therein, rigidly secured thereto, interengaging means between the core and casing, shoes arranged in and disposed circumferentially around the casing and contacting with the casing opposite the tread surface thereof, interengaging means between the shoes and the casing, means for loosely and pivotally connecting the confronting ends of the shoes, a web arranged centrally of and extending the length of each shoe and received in the hollow core, said webs having substantially 8-shaped slots therein and parts carried by the core to be received in said slots, spring influenced wings pivotally secured to the ends of the shoes, compression pumps having their inner ends suspended in the core, and having plungers therein spring influenced in one direction and rods for the plungers which are connected to the webs and each of said pumps having a pipe connection communicating with the atmosphere, and an air gage on each pipe for determining the admission of air into the pumps.

11. A tire construction including a vulcanized rubber casing, a hollow core therein, rigidly secured thereto, interengaging means between the core and casing, shoes arranged in and disposed circumferentially around the casing and contacting with the casing opposite the tread surface thereof, interengaging means between the shoes and the casing, means for loosely and pivotally connecting the confronting ends of the shoes, a web arranged centrally of and extending the length of each shoe and received in the hollow core, said webs having substantially 8-shaped slots therein and parts carried by the core to be received in said slots, spring influenced wings pivotally secured to the ends of the shoes, compression pumps having their inner ends suspended in the core, and having plungers therein spring influenced in one direction and rods for the plungers which are connected to the webs and each of said pumps having a pipe connection communicating with the atmosphere, and means on each pipe for ascertaining the quantity of air admitted into each pump.

12. A tire construction including a vulcanized rubber casing, a hollow core therein, rigidly secured thereto, interengaging means between the core and casing, shoes arranged in and disposed circumferentially around the casing and contacting with the casing opposite the tread surface thereof, interengaging means between the shoes and the casing, means for loosely and pivotally connecting the confronting ends of the shoes, a web arranged centrally of and extending the length of each shoe and received in the hollow core, said webs having substantially 8-shaped slots therein, and parts carried by the core to be received in said slots, spring influenced wings pivotally secured to the ends of the shoes, compression pumps having their inner ends suspended in the core, and having plungers therein spring influenced in one direction and rods for the plungers which are connected to the webs and each of said pumps having a pipe connection communicating with the atmosphere, and means on each pipe for determining the working of each pump.

In testimony whereof I affix my signature.

ALVA S. NORMENT.